(12) United States Patent
Draper et al.

(10) Patent No.: US 8,171,600 B2
(45) Date of Patent: May 8, 2012

(54) OMNI-DIRECTIONAL HANDLE (75) Inventors: Steven Steele Draper, Colorado Springs, CO (US); Zachary Earl Conrad, Westminster, CO (US)

(73) Assignee: Gyrobag, LLC, Colorado Springs, CO (US)

( * ) Notice: Subject to any disclaimer, the term of this patent is extended or adjusted under 35 U.S.C. 154(b) by 186 days.

(21) Appl. No.: 12/800,582

(22) Filed: May 18, 2010

(65) Prior Publication Data

US 2010/0293755 A1   Nov. 25, 2010

Related U.S. Application Data (60) Provisional application No. 61/179,574, filed on May 19, 2009.

(51) Int. Cl.
*G05G 1/06* (2006.01)

(52) U.S. Cl. .................. 16/441; 16/113.1; 16/DIG. 41

(58) Field of Classification Search .......... 16/441, 16/DIG. 41, 433, 417, 113.1; 15/143.1, 144.1, 15/144.2; 74/543, 544, 546, 547, 553, 557, 74/551.8, 551.9, 558.5; 403/76, 122, 114, 403/132, 133; 190/115, 18 A; 280/47.371, 280/47.315, 47.17, 655, 655.1; 81/489, 492, 81/177.7, 177.75
See application file for complete search history.

(56) References Cited

U.S. PATENT DOCUMENTS

| | | | |
|---|---|---|---|
| 320,436 A * | 6/1885 | Hock | 15/144.2 |
| 483,311 A | 9/1892 | Remaly | |
| 892,105 A * | 6/1908 | White | 248/60 |
| 1,317,903 A | 10/1919 | Whimster | |
| 2,660,911 A * | 12/1953 | Queitzsch | 81/61 |
| 2,854,683 A * | 10/1958 | Warden | 15/144.2 |
| 2,855,232 A | 10/1958 | Kozak | |
| 2,984,995 A | 5/1961 | Kalen | |
| 3,154,333 A | 10/1964 | Townsend | |
| 3,160,430 A | 12/1964 | Gottshald | |
| 3,342,513 A | 9/1967 | Melton et al. | |
| 3,433,510 A | 3/1969 | Hulterstrum | |
| 3,609,864 A * | 10/1971 | Bassett | 30/261 |
| 3,866,257 A * | 2/1975 | Cansdale, Sr. | 15/230.11 |
| 3,945,739 A | 3/1976 | Abe | |
| 4,043,686 A | 8/1977 | Hackett | |
| 4,109,821 A * | 8/1978 | Lutz | 220/836 |
| 4,601,603 A | 7/1986 | Nakayama | |

(Continued)

FOREIGN PATENT DOCUMENTS

GB    2458316 A  *  9/2009

*Primary Examiner* — Chuck Y. Mah
(74) *Attorney, Agent, or Firm* — Linda Flewellen Gould (57) ABSTRACT

The present invention provides a handle for attachment to luggage, vacuum cleaners, or another object to be moved. The handle includes a ball with a smooth surface surrounded by a hollow socket. A hole in the socket provides a passage way for a rod or other attachment mechanism to extend from the ball to the object to be moved. The socket freely moves in all directions with respect to the ball and the attachment mechanism, limited only by contact between the attachment mechanism and the edge of the hole in the socket which surrounds that attachment mechanism. Multiple ribs protrude from the interior of the hollow socket toward the ball, decreasing potential friction between the socket and the ball, thus facilitating free movement of the socket. In this manner, the socket automatically moves into a position which is ergonomically desirable for the user grasping the socket to move the object.

10 Claims, 11 Drawing Sheets

U.S. PATENT DOCUMENTS

| | | | |
|---|---|---|---|
| 4,620,813 A | | 11/1986 | Lacher |
| 4,695,181 A | | 9/1987 | Rahmede et al. |
| 4,714,477 A | | 12/1987 | Fichera et al. |
| 4,838,396 A | | 6/1989 | Krenzel |
| 5,098,213 A | | 3/1992 | Day |
| 5,265,307 A | | 11/1993 | Hull et al. |
| 5,280,871 A | | 1/1994 | Chuang |
| 5,551,115 A | * | 9/1996 | Newville ................ 15/172 |
| 5,704,727 A | * | 1/1998 | Atkins et al. ............ 403/135 |
| 5,732,443 A | | 3/1998 | Kazmark, Jr. et al. |
| 5,782,574 A | | 7/1998 | Henkel |
| 6,206,785 B1 | | 3/2001 | Thomas |
| 6,238,124 B1 | | 5/2001 | Merlo |
| 6,350,060 B1 | | 2/2002 | Peterson |
| 6,360,402 B1 | | 3/2002 | Crabtree |
| 6,470,533 B1 | | 10/2002 | Comstock |
| 6,505,990 B1 | * | 1/2003 | Maughan ................ 403/135 |
| 6,692,179 B2 | | 2/2004 | Bohne et al. |
| 6,761,499 B2 | | 7/2004 | Bohne et al. |
| 7,073,970 B2 | | 7/2006 | Gercke et al. |
| 7,270,223 B2 | | 9/2007 | Miller |
| 7,275,981 B1 | * | 10/2007 | Hurt et al. ................ 451/524 |
| 7,341,544 B2 | * | 3/2008 | St. George et al. .......... 482/82 |
| 2002/0050429 A1 | * | 5/2002 | Nykoluk et al. ........... 190/115 |
| 2003/0085089 A1 | * | 5/2003 | Lin et al. ................ 190/115 |
| 2005/0011043 A1 | | 1/2005 | Comstock |
| 2006/0026794 A1 | | 2/2006 | Streetman |
| 2006/0260894 A1 | | 11/2006 | Burgess et al. |
| 2006/0272126 A1 | | 12/2006 | Burgess et al. |
| 2008/0022483 A1 | * | 1/2008 | Potoroka ................ 15/340.2 |

* cited by examiner

OMNI-DIRECTIONAL HANDLE

REFERENCE TO RELATED APPLICATIONS

This is a non-provisional application for the invention disclosed in U.S. Provisional Application Ser. No. 61/179,574 filed May 19, 2009.

BACKGROUND OF THE INVENTION

1. Field of the Invention

The present invention relates to a specialized handle which can be attached to an object to be moved. The handle includes a ball and surrounding hollow socket which is specially designed to allow free movement of the socket with respect to the ball, allowing a user who grasps the socket to direct and move an object attached to the ball at an angle that is automatically ergonomically advantageous.

2. Description of the Prior Art

Many different types of handles are known in the prior art. Some handles are particularly useful for lifting and moving objects above the ground, such as a hose extending from a vacuum cleaner. Other handles may be designed for dragging an object, on a surface, such as a wheeled piece of luggage, a wheeled golf bag, or a garbage can. In each case, it is advisable to utilize a handle which is comfortable to grasp and which permits the user's hand and wrist to form a straight angle as the user controls and moves the object attached to the handle. The user moving the object will experience minimal wrist torque if the handle moves into a position that allows the user's hand and wrist to form a straight angle regardless of the direction the object is being directed.

For example, U.S. Pat. No. 5,265,307 to Hull et al. teaches a handle which can be adjusted through vertical and horizontal axes and then locked into the position that a user finds most comfortable. While this design is an improvement over static handles, once the handle is locked in place, it cannot adjust to minimize wrist torque as the user changes the direction in which the object is being moved unless the user unlocks the position of the handle, manually changes the position of the handle, and re-locks the handle in a new position.

Handles exist which allow the handle to adjust with limited degrees of freedom or within one or two dimensions of movement. Examples of some handles which allow adjustment with respect to the object being moved in limited planes of motion include U.S. Pat. No. 4,838,396 to Krenzel, U.S. Pat. No. 5,732,443 to Kazmark, Jr. et U.S. Pat. No. 6,470,533 to Comstock, U.S. Patent Application 2005/0011043 of Comstock, U.S. Patent Application 2006/0026794 of Streetman, U.S. Patent Application 2006/0260894 of Burgess et al., U.S. Patent Application 2006/0272126 of Burgess et al. and U.S. Pat. No. 7,270,223 to Miller.

The omni-directional handle claimed herein allows the user's hand to be automatically directed into an ergonomically advantageous position with respect to the object being moved as the handle moves in an infinite number of planes in response to the directional force exerted by the weight of the object. The handle can be grasped in many different positions to accommodate whatever grasp is most comfortable to the user, unlike the handle of U.S. Pat. No. 6,360,402 to Crabtree. The handle freely rotates through three hundred and sixty degrees relative to the position of the object being moved.

The omni-directional handle depends on a ball attached to the object to be moved, which ball is encapsulated by a freely moving socket to be held by the user. Many ball and socket designs are known in the prior art. However, many known ball and socket devices are purposely engineered to cause the ball to be held in a fixed position with respect to the socket rather than promoting free movement of the socket around the ball. Examples of such ball and socket designs include U.S. Pat. No. 483,311 to Remaly (for use in a plow), U.S. Pat. No. 892,105 to White, U.S. Pat. No. 1,317,903 to Whimster, U.S. Pat. No. 2,984,995 to Kalen (for use in a nuclear reactor), U.S. Pat. No. 3,342,513 to Melton et al., U.S. Pat. No. 3,433,510 to Hulterstrum, U.S. Pat. No. 4,043,686 to Hackett, U.S. Pat. No. 4,620,813 to Lacher, U.S. Pat. No. 5,280,871 to Chuang, and U.S. Pat. No. 6,238,124 to Merlo. Similarly, U.S. Pat. No. 5,098,213 to Day teaches a static ball joint with a friction pad designed to purposely limit the socket's range of motion.

Many ball and socket designs require a bearing mechanism between the ball and socket, which bearing necessarily inhibits motion of the socket. Examples of such designs with a bearing mechanism include U.S. Pat. No. 2,855,232 to Kozak, U.S. Pat. No. 3,154,333 to Townsend, U.S. Pat. No. 3,945,739 to Abe, U.S. Pat. No. 4,601,603 to Nakayama, U.S. Pat. No. 4,695,181 to Rahmede et al., U.S. Pat. No. 4,714,477 to Fishera et al., U.S. Pat. No. 6,206,785 to Thomas, U.S. Pat. No. 6,350,060 to Peterson, U.S. Pat. Nos. 6,692,179 and 6,761,499 to Bohne et al., and U.S. Pat. No. 7,073,970 to Gercke et al. Similarly, required lubricant between a ball and socket, as in U.S. Pat. No. 3,160,430 to Gottshald and U.S. Pat. No. 5,782,574 to Henkel, impedes free movement of the socket relative to the ball.

A handle device is needed that can be attached to items as diverse as luggage, garbage cans, vacuum cleaners, tools, mops, brooms, and golf equipment, so that when the handle is grasped by a user, the handle automatically moves into a position that is ergonomically advantageous for the user, allowing the user to position and move the object with minimal strain on the user's wrist.

SUMMARY AND OBJECTS OF THE INVENTION

A primary object of the present invention is to provide a method of directing and moving an object in a manner that minimizes wrist-torque for the person moving the object.

Another object of the present invention is to provide a handle which can be attached to an object to be moved which handle permits the user's hand and wrist to continuously maintain an ergonomically beneficial position without letting go of the handle.

Yet another object of the present invention is to provide such a handle which accommodates a control mechanism by which a user can control some function on the object.

These objects are achieved by a device consisting of a ball and a hollow socket surrounding that ball. An attachment mechanism, such as a rigid rod with standard connection apparati at each end, connects the ball to an object to be moved. A hole formed in the socket permits the attachment mechanism to extend from the ball to the object. The socket is freely moveable with respect to the ball, constrained only to the extent the edge of the hole in the socket encounters the attachment mechanism. Thus, the socket can move in all directions with respect to the ball, and freely floats in an infinite number of planes.

The socket is ideally configured in a size and shape that can be comfortably grasped by a human hand. Different shapes may be utilized to accommodate different hand sizes, including spheres, ovals, cylinders, and discs of a variety of sizes. When the socket is grasped, the user is able to apply force in the direction the user desires the object to be moved, causing the socket to be pulled against the ball and thus directing the ball, and the object to which the ball is attached, in the direction chosen by the user. In this manner the object to which the ball is attached by the attachment mechanism can be pushed, pulled, and lifted by movement of the socket. However, because the socket still moves freely with respect to the ball, the direction in which force is applied can be easily altered at any time, changing the direction in which the object is being moved without letting go of the socket, while maintaining an ergonomically advantageous position of the user's wrist with respect to the user's hand.

The handle is designed to minimize friction between the interior of the socket and the exterior of the ball, to permit the socket to move easily around the ball without impediment. Therefore, it is beneficial to make the exterior surface of the ball smooth. Ribs protruding from the interior surface of the hollow socket reduce the amount of area on the interior of the socket which can be touched by the ball, effectively reducing friction caused by contact between the ball and socket. Friction between the socket and ball can be significantly reduced by using rounded ribs with no edges, such ribs extending in a continuous line parallel to each other around the circumference of the interior of the socket.

In the drawings, the following legend has been used:

1 Omni-directional handle
2 Socket
3 Segment of socket
4 Opposite segment of socket
5 Attachment opening in socket
6 Exterior surface of socket
7 Interior surface of socket -continued 8 Ball
9 Second opening in socket
10 Ribs protruding from interior of socket
11 User's hand
12 Attachment mechanism
13 Connections for socket segments
14 Opening for control mechanism in ball
15 Object
16 Exterior surface of ball
17 Control mechanism

DESCRIPTION OF THE PREFERRED EMBODIMENT

The present invention provides an omni-directional handle suitable for pulling, pushing, directing, and moving a wide variety of objects in an ergonomically advantageous manner. In the following description, numerous specific details are set forth in order to provide a thorough understanding of the present invention. It will be obvious, however, to one skilled in the art that the present invention may be practiced without these specific details. Some well-known methods and structures have not been set forth in order not to unnecessarily obscure the description of the present invention.

Figure 1:
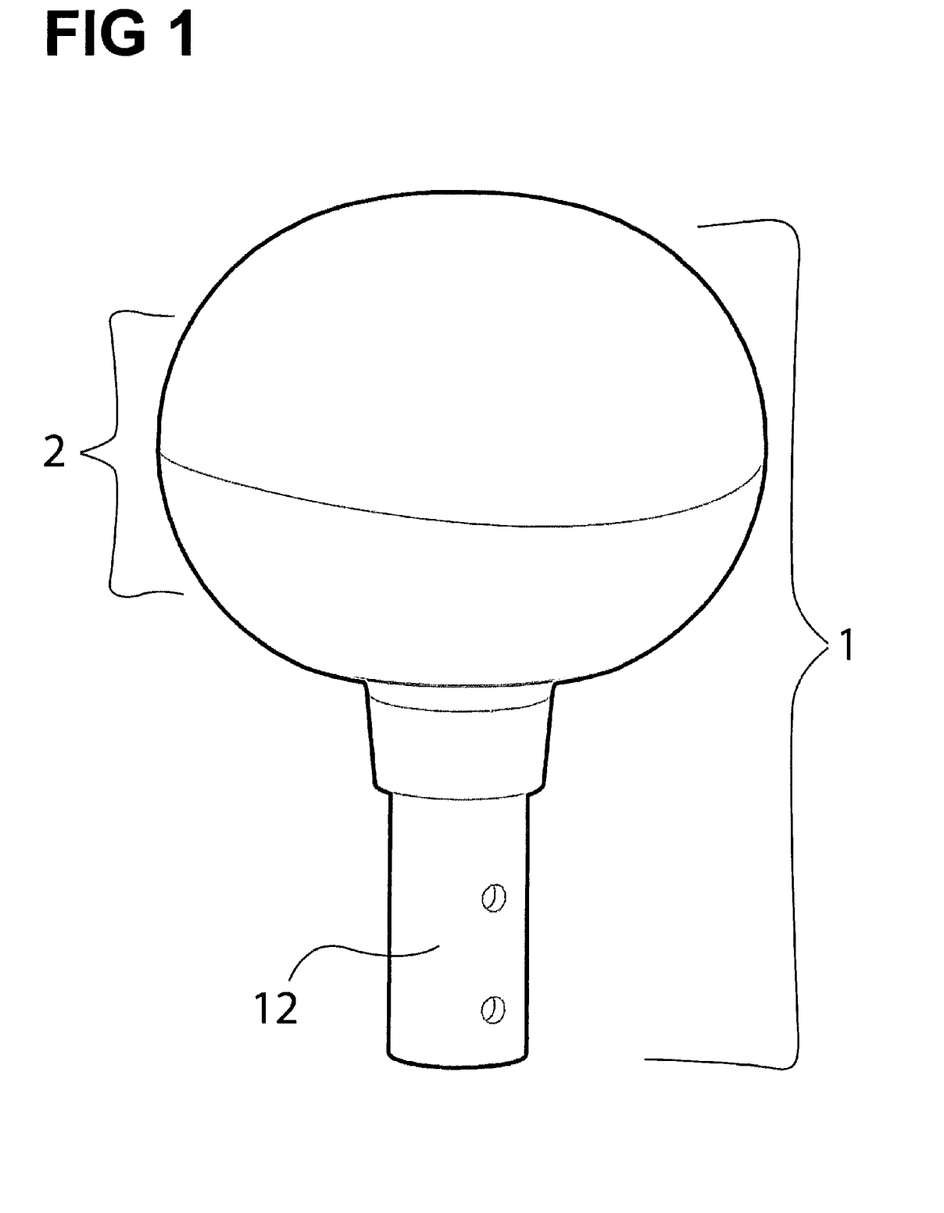
FIG. 1 is a side view of an omni-directional handle, according to the present invention.
Figure 2:
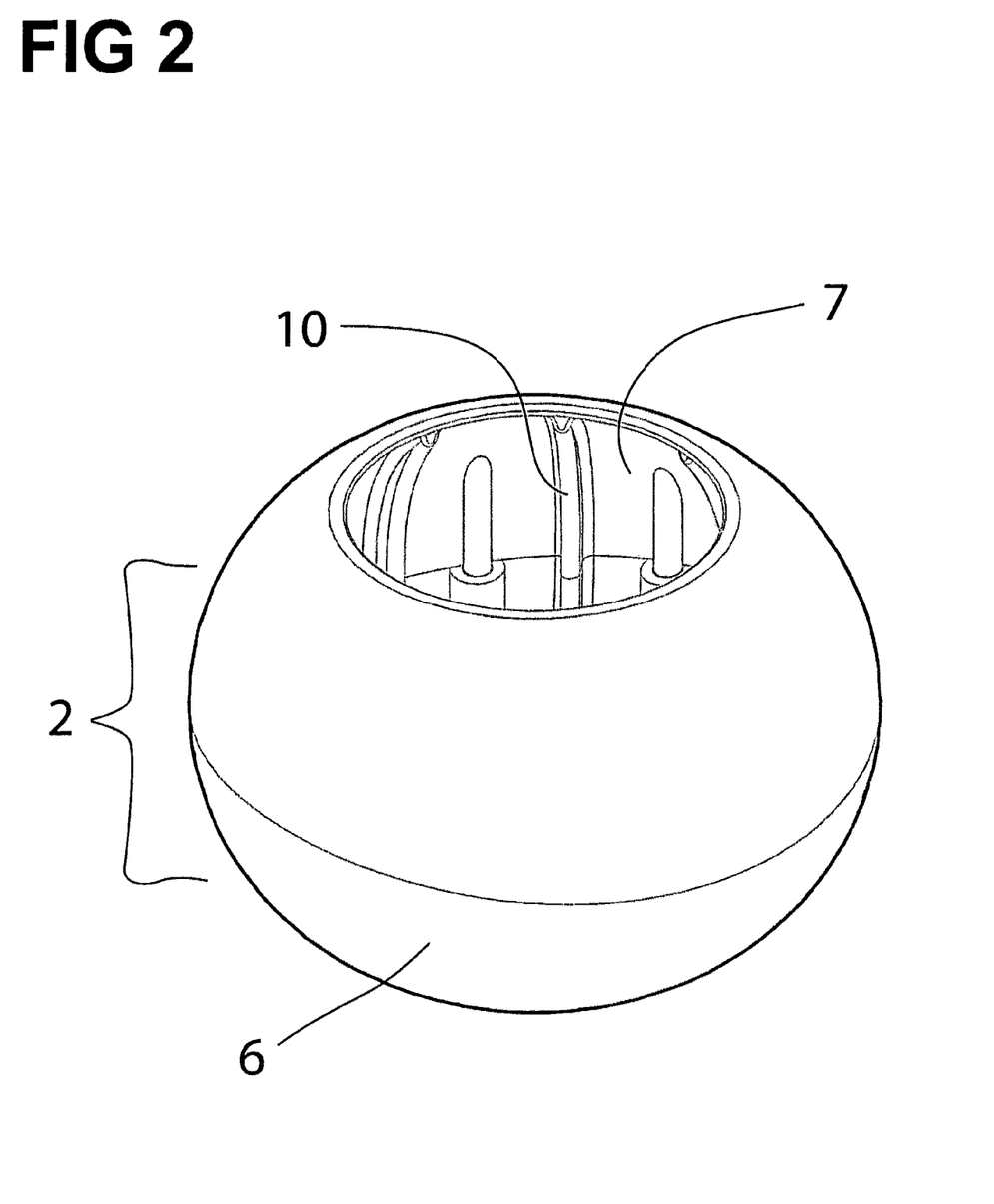
FIG. 2 is a perspective view of a socket which is a part of the omni-directional handle of the present invention.
Figure 7:
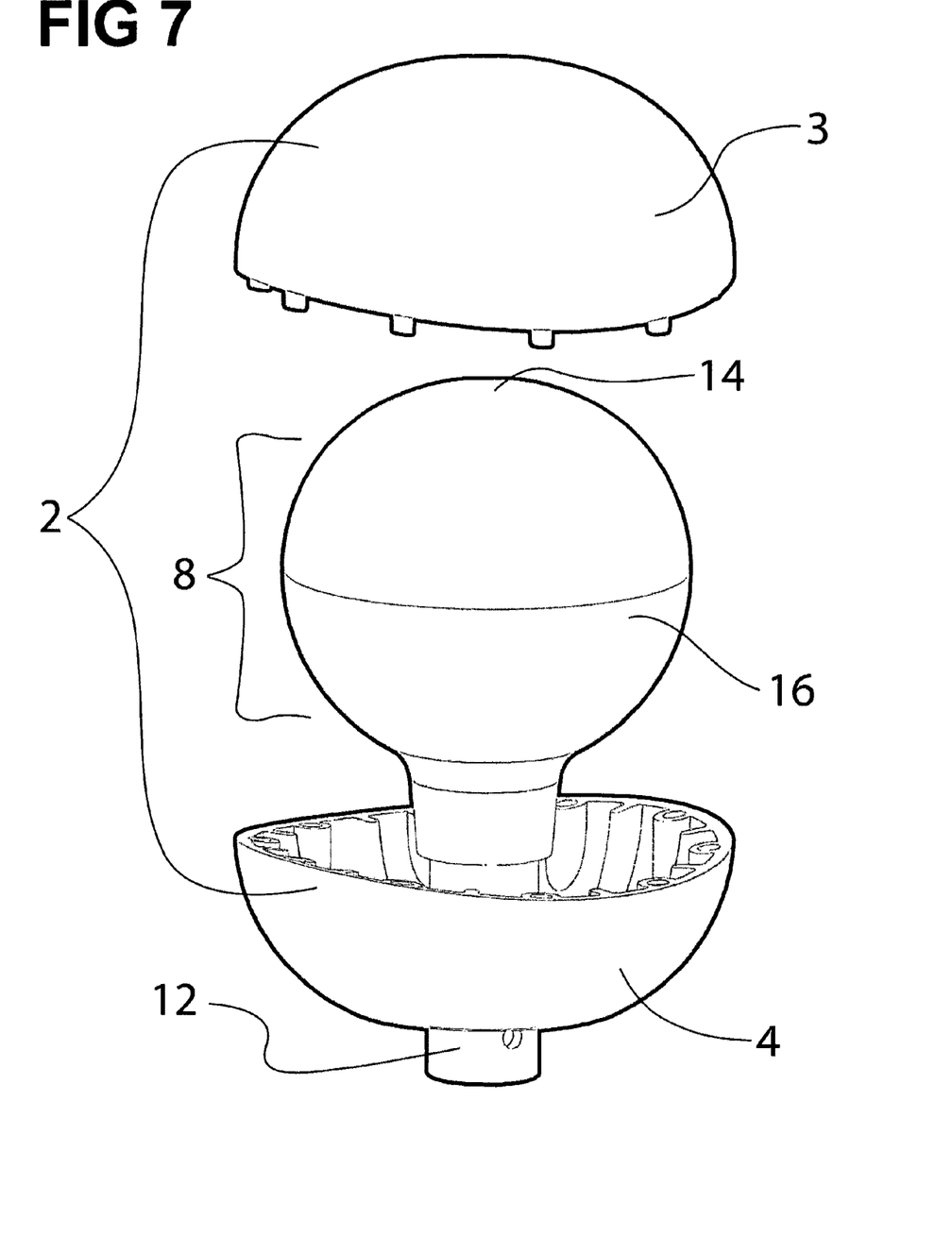
FIG. 7 is a perspective view of the omni-directional handle of the present invention, with the two segments of the socket separated to view the interior of the handle.

As shown in FIGS. 1 and 7, the handle 1 of the present invention includes a circular ball 8 surrounded by a socket 2, with an attachment mechanism 12 extending from the ball 8 through a hole 5 in the socket 2. The attachment mechanism 12 can conveniently be a rigid rod 12 which is connected by conventional means to the ball 8 at one end and to an object 15 to be moved at the opposite end of that rod 12. The socket 2 has an interior surface 7 and exterior surface 6, as shown in FIG. 2.

Figure 3:
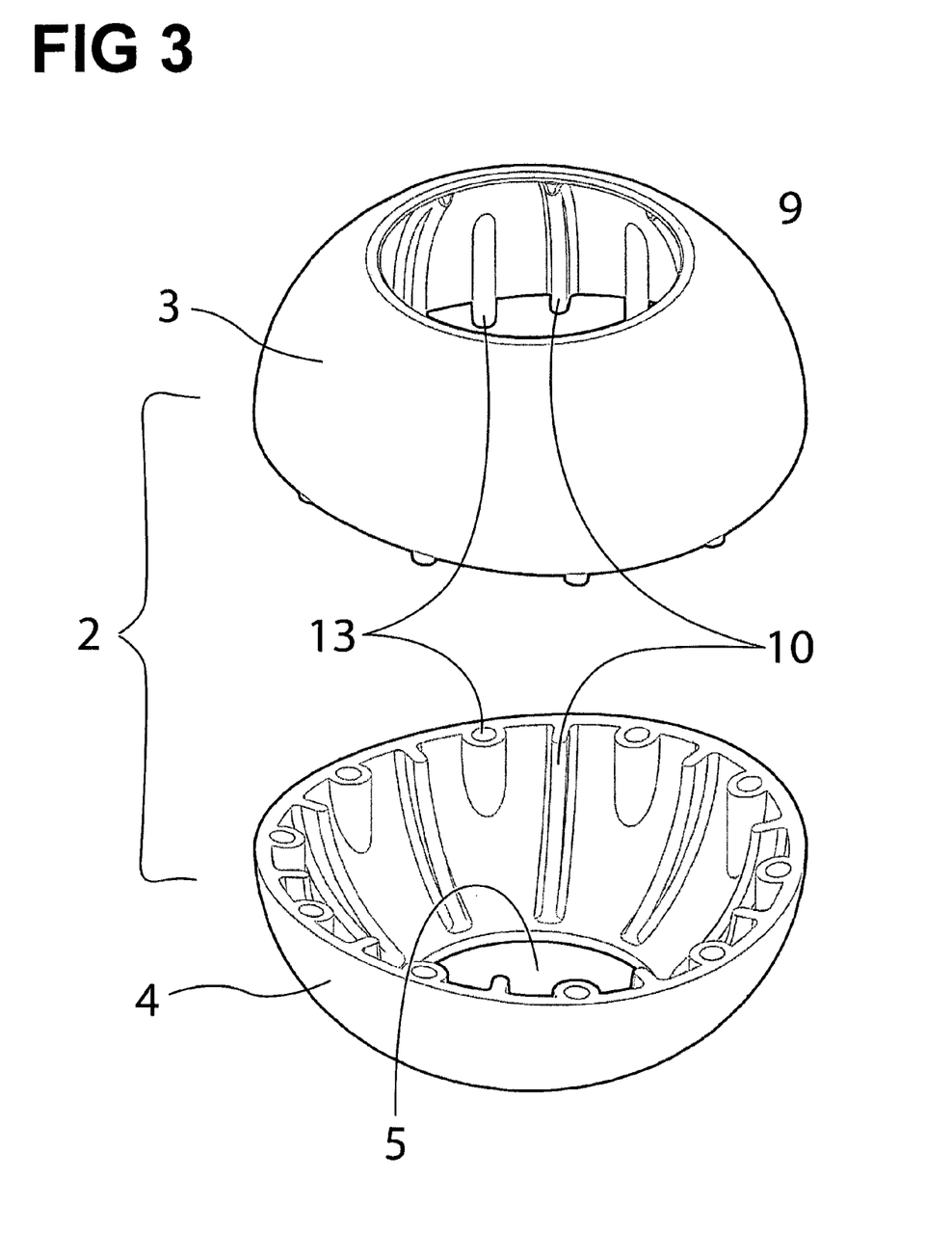
FIG. 3 is a perspective view of the socket portion of the omni-directional handle, separated into two segments to provide a view of the interior of the socket and to provide a view of attachment mechanisms by which the two segments can be connected.

As shown in FIG. 3, for ease of assembly, the socket 2 can be constructed of two segments 3,4, which are connected together, encapsulating the ball 8, by conventional means such as screws, pins, brads, or other fasteners (not shown) inserted into mating fastener receptacles 13. The fastener receptacles 13 extend from the interior surface 7 of each socket segment 3,4, so that a receptacle 13 of segment 3 can be aligned adjacent to a receptacle 13 of segment 4 to permit a fastener to be inserted through the adjoining fasteners 13, holding segments 3,4 together to form the socket 2. Alternatively, an extension (not shown) from one segment 3 may be fashioned to fit within a receptacle 13 in the other segment 4 to secure the two segments 3,4 into place around the ball 8. The socket 2 may be spherical, oval, or any other shape that will encapsulate the ball 8 and be comfortable for grasping.

Figure 4:
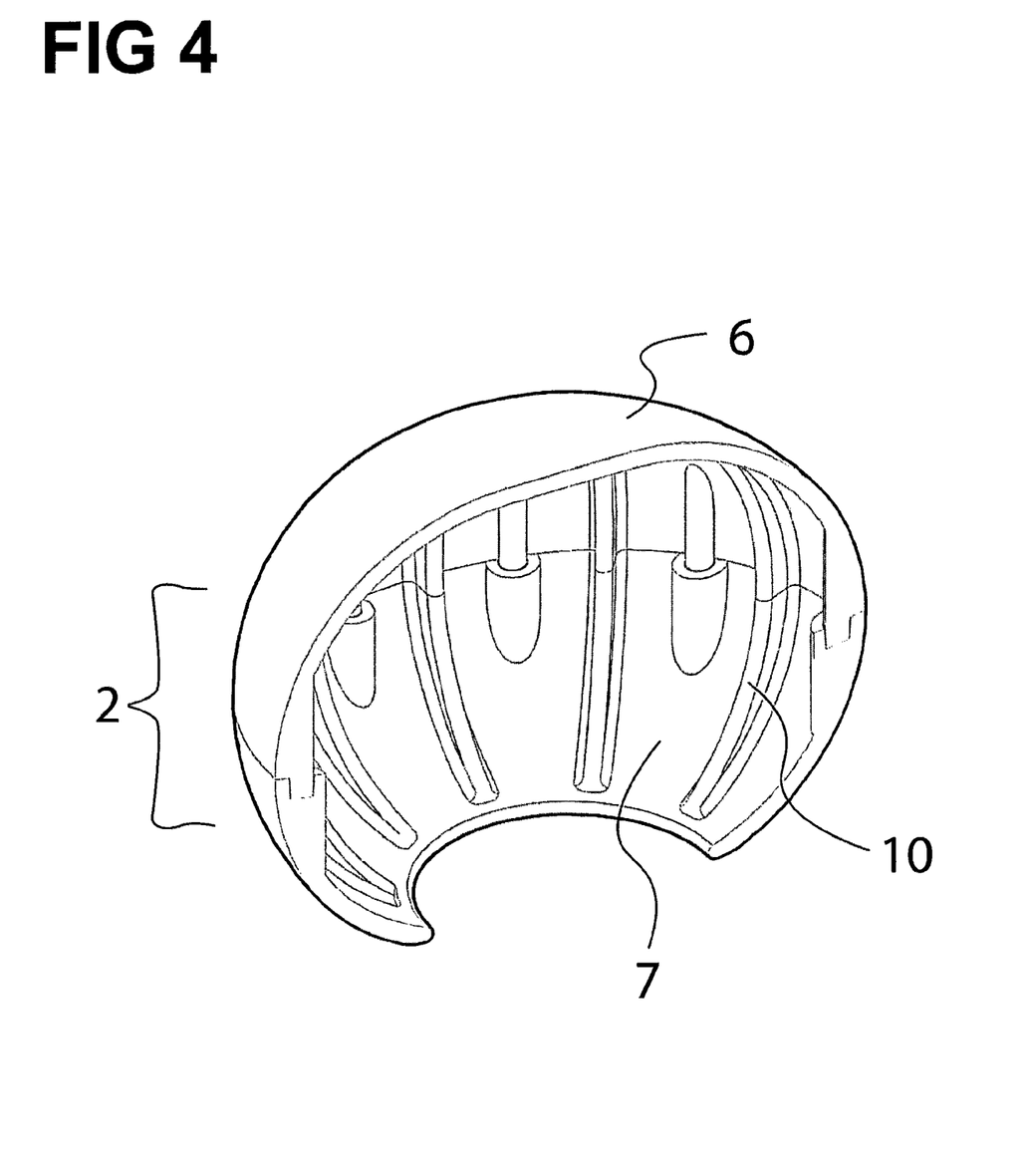
FIG. 4 is a perspective cut-away view of the socket portion of the omni-directional handle.
Figure 5:
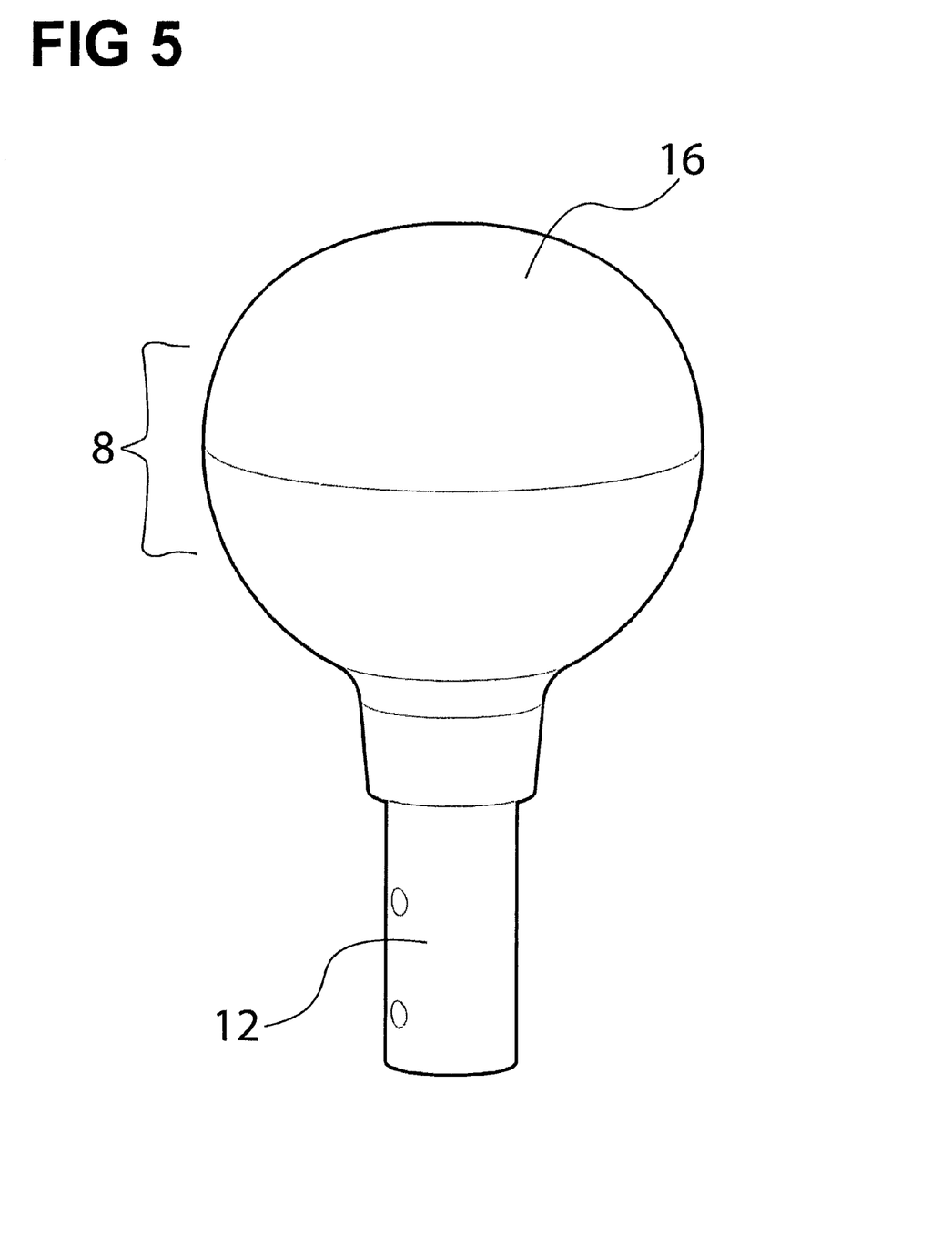
FIG. 5 is a side view of one embodiment of the ball which is inside the omni-directional handle of the present invention, with an attachment mechanism extending from the ball toward an object to be moved.

To minimize friction between the ball 8 and socket 2 and thus facilitate ease of movement of the socket 2 with respect to the ball 8, the exterior of the ball 16 may be provided with a smooth surface, represented in FIG. 5. Furthermore, as best shown in FIG. 4, it is beneficial to provide rounded, smooth ribs 10 which protrude from the interior surface 7 of the socket 2 toward the ball 8, thus reducing the total area of the socket surface 7 which can be contacted by the ball 8. By curving or rounding the edges of the ribs 10 and extending the ribs 10 in continuous fashion around the socket 2, interrupted only by openings in the socket 5, 9, the area of the socket interior surface 7 which can be touched by the ball 8 is minimized, thereby reducing friction between the ball 8 and socket 2.

Figure 8:
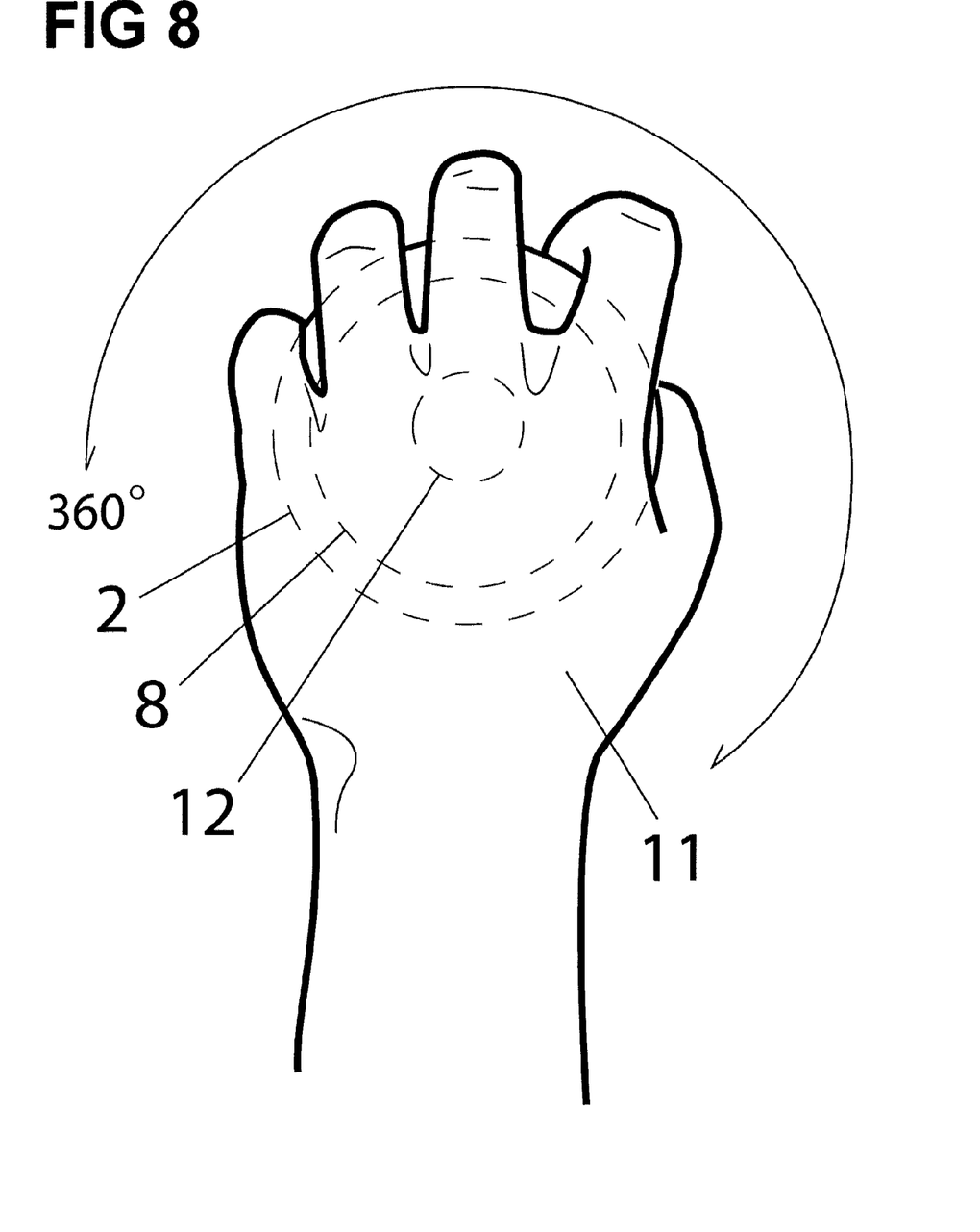
FIG. 8 is a perspective top view of the hand of a user gripping the omni-directional handle.
Figure 9:
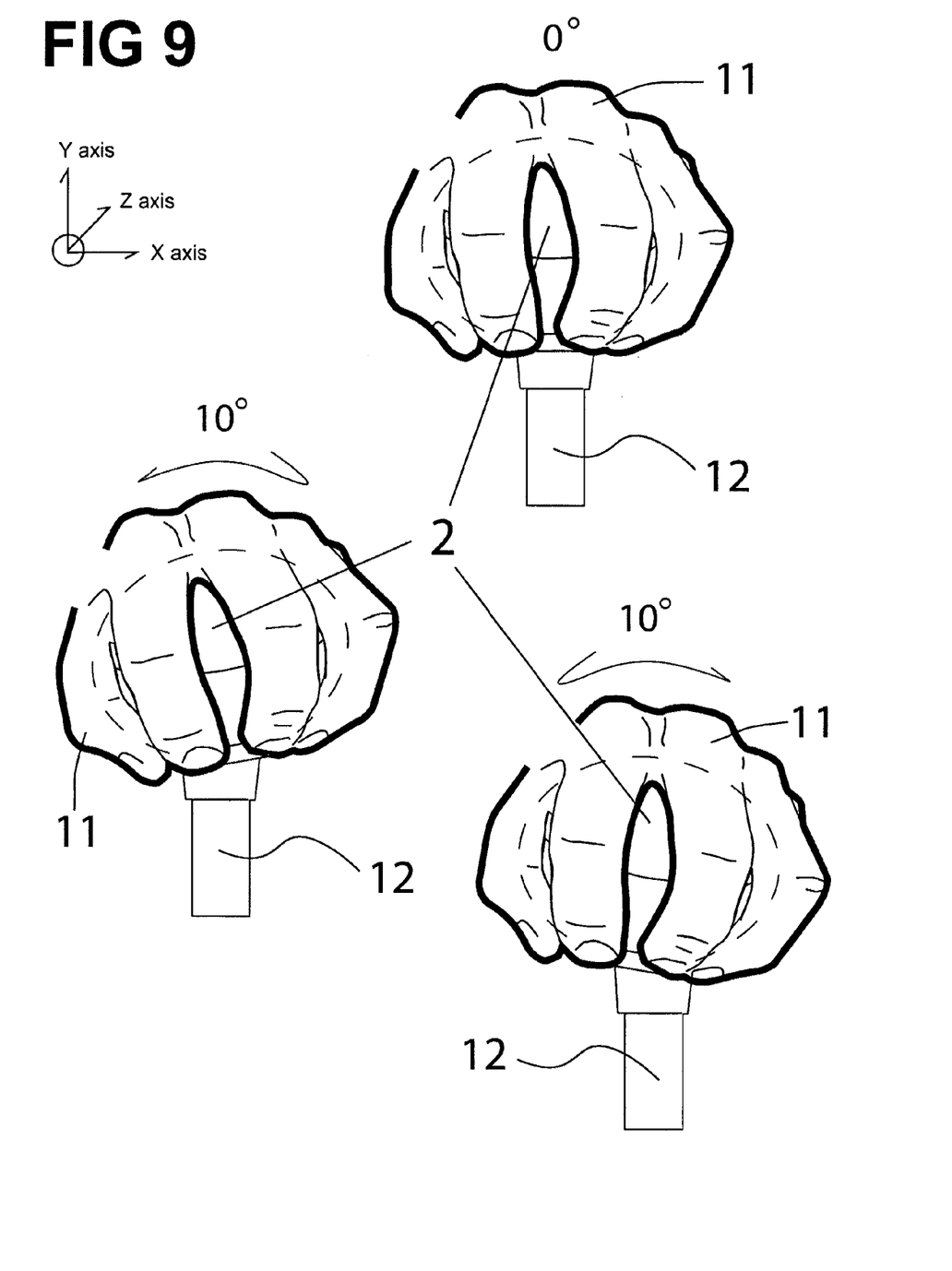
FIG. 9 is three perspective front views of the hand of a user gripping the omni-directional handle, showing the socket in different positions with respect to the ball inside the socket.
Figure 10:
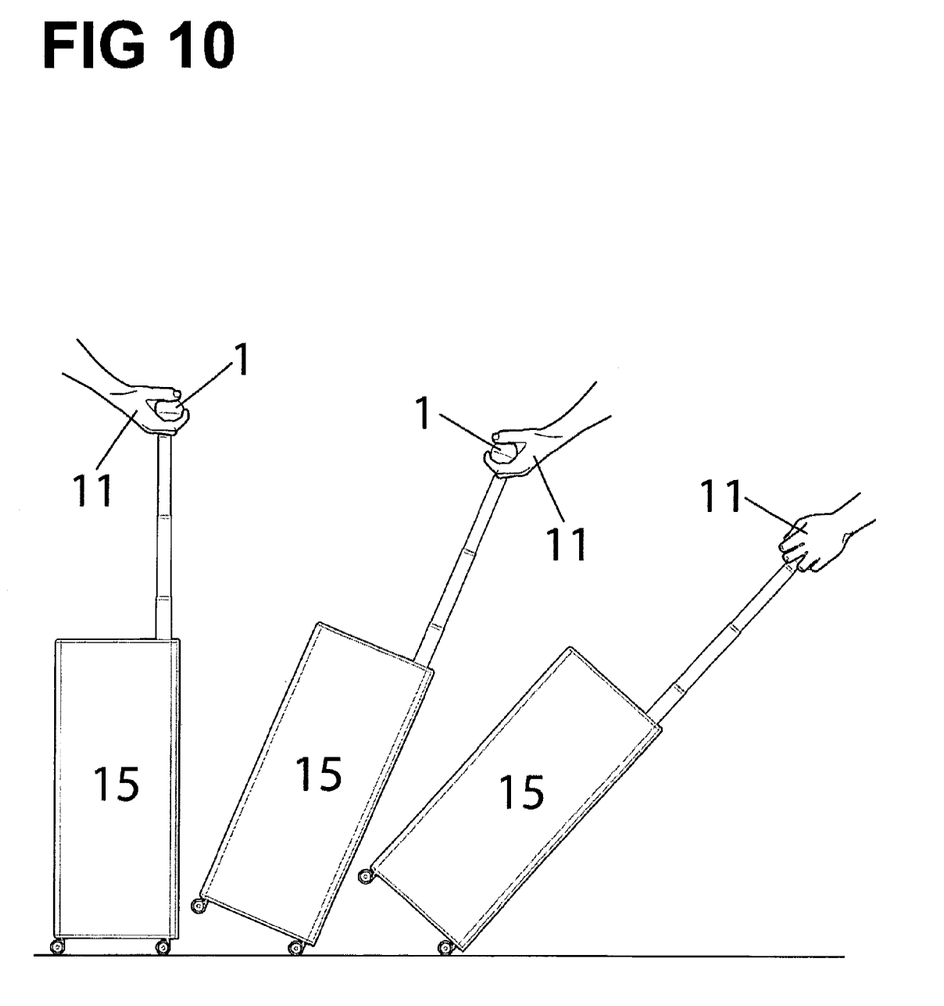
FIG. 10 is three perspective side views of a user's hand grasping the omni-directional handle attached to a piece of luggage.
Figure 11:
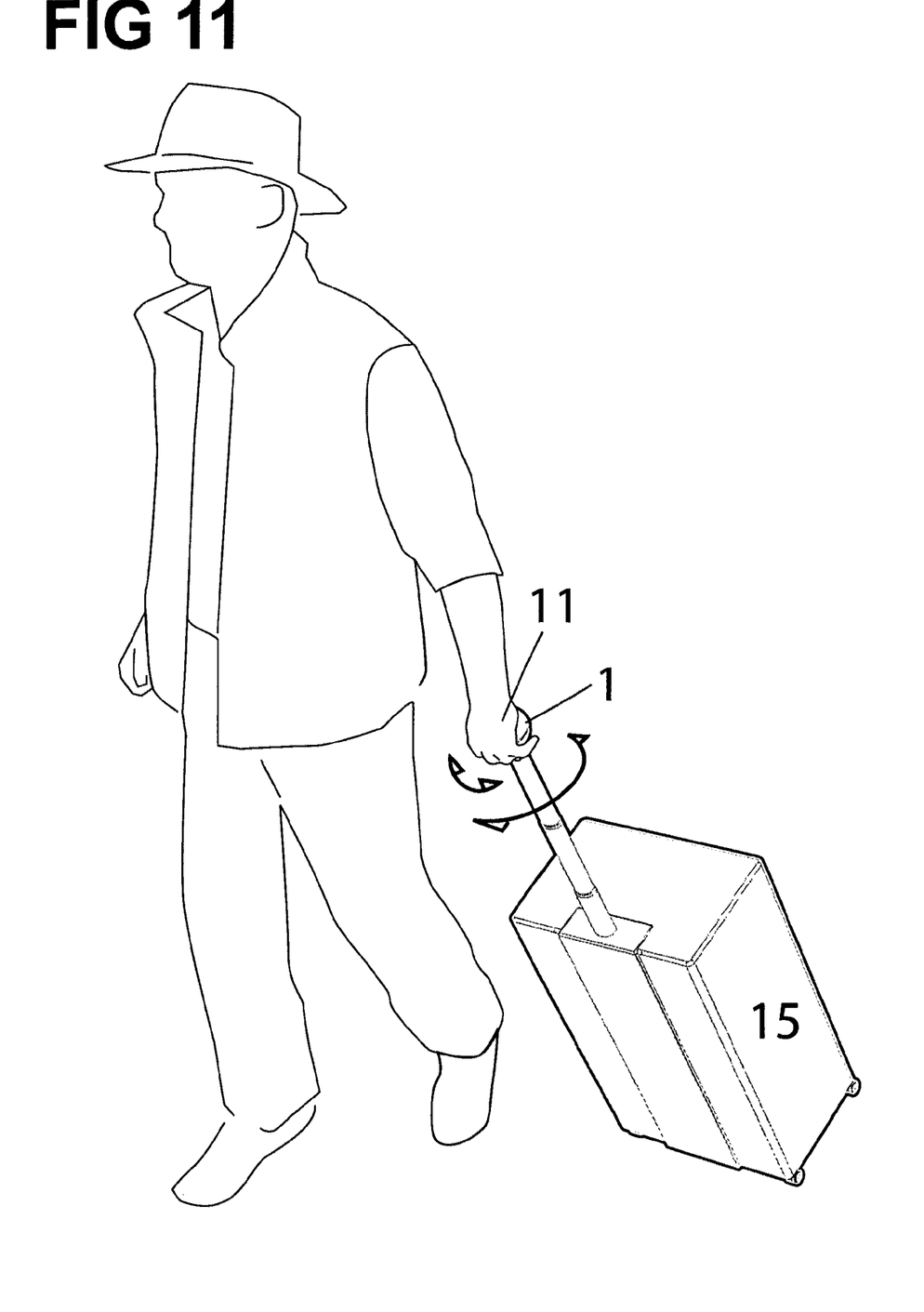
FIG. 11 is a perspective view of a user grasping the omni-directional handle attached to a piece of luggage.

As shown in FIG. 8, when the socket 2 is grasped in a user's hand 11, the socket 2 can be easily moved three hundred and sixty degrees in a given plane. Furthermore, as shown by the three examples in FIG. 9, the socket 2 can be freely moved by the user's hand 11 in multiple planes. As a result, when the handle 1 is attached to an object 15 like the luggage shown in FIG. 10, the socket 2 can be firmly grasped in a user's hand 11, while the object 15 is tilted, pushed, and pulled, since the socket 2 freely moves in multiple directions around the ball 8 which is attached to the object 15. The user, as shown in FIG. 11, can continue to firmly grasp the handle 1 as the object is moved in many different directions. Because the socket 2 moves freely with respect to the ball 8, the user can easily maintain an ergonomically advantageous straight angle between the user's wrist and hand, while the object is moved in different directions.

Both the ball 8 and the socket 2 can be made of any rigid material, such as plastic, silicon, or rubber.

Figure 6:
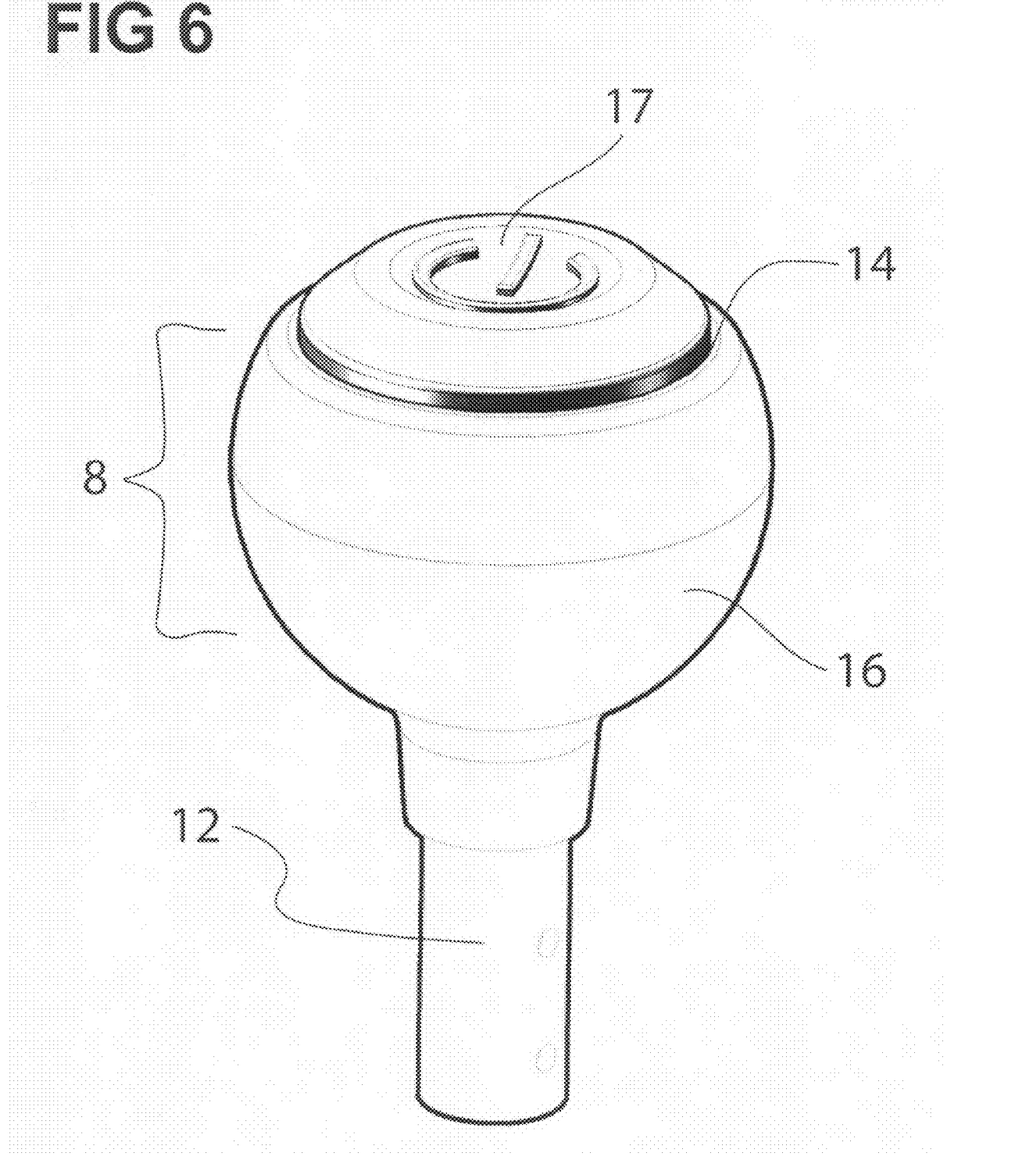
FIG. 6 is a side view of another embodiment of the ball which is inside the omni-directional handle of the present invention, with an attachment mechanism extending from the ball toward an object to be moved.

As shown in FIG. 6, it is possible to construct the ball 8 with an opening 14 corresponding to a second opening 9 in the socket 2. These openings would beneficially permit a user to access a control mechanism 17 within the ball 8. For example, the ball 8 could advantageously be constructed with a recessed control button 17 which can be pushed by a finger or thumb inserted through the opening 9 in the socket 2 and the opening 14 in the ball 8. That control mechanism 14 could be mechanically or electrically connected to the object 15 in a manner that allows a function associated with the object 15 to be controlled by pressing the mechanism 14. If the object 15 is luggage, the control button 14 might activate an auxiliary mechanism on the luggage that retracts or extends a handle which is recessed in the luggage.

Although the present invention has been described in terms of the presently preferred embodiment, it is to be understood that such disclosure is purely illustrative and is not to be interpreted as limiting. Consequently, without departing from the spirit and scope of the invention, various alterations, modifications, or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

We claim:

1. A handle for attaching to and moving an object, comprising:
   a. a ball having smooth exterior surface,
   b. attachment means for attaching the ball to the object,
   c. a hollow socket, adapted to be grasped by a hand of a user, surrounding said ball, having an interior surface and an exterior surface, having a first opening formed in said socket through which said attachment means extends from outside the exterior of said socket to said ball,
   d. a plurality of ribs protruding from said interior of said hollow socket towards said ball, so that said ribs are touchable by said ball as the hollow socket is moved with respect to said ball and so that said ribs prevent said ball from touching said interior surface of said hollow socket,
   e. wherein said socket is movable in all directions with respect to said ball.

2. A handle according to claim 1, wherein said attachment means comprises a rod connected at one end to said ball and connectable at an opposite end to the object.

3. A handle according to claim 1, wherein each rib is rounded.

4. A handle according to claim 1, wherein said socket further comprises a plurality of matching socket segments which are secured together around said ball to form said hollow socket.

5. A handle according to claim 1, wherein a second opening is formed in said socket through which said ball is manually accessible.

6. A handle according to claim 5, wherein said ball further comprises a control mechanism for controlling a feature of the object, which control mechanism is manually accessible through said second opening in said socket.

7. A handle according to claim 5, wherein each rib extends along said interior surface of said socket from said first opening to said second opening.

8. A handle according to claim 1, wherein said hollow socket is circular.

9. A handle according to claim 1, wherein said hollow socket is elliptical.

10. A method of moving an object, comprising the steps of:
   a. Attaching a handle to the object, said handle comprised of:
      i. a ball having smooth exterior surface,
      ii. attachment means for attaching said ball to the object,
      iii. a hollow socket surrounding said ball, having an interior surface and an exterior surface, having a first opening formed in said socket through which said attachment means extends from outside the exterior of said socket to said ball,
      iv. a plurality of ribs protruding from said interior of said hollow socket towards said ball, so that said ribs are touchable by said ball as the hollow socket is moved with respect to said ball and so that said ribs prevent said ball from touching said interior surface of said hollow socket,
      v. wherein said socket is movable in all directions with respect to said ball,
   b. Grasping said hollow socket of said handle, and
   c. Moving said handle in a desired direction for movement of the object.

* * * * *